United States Patent

[11] 3,625,914

[72] Inventor  Morice William Thompson
              Maidenhead, England
[21] Appl. No. 739,168
[22] Filed     June 24, 1968
[45] Patented  Dec. 7, 1971
[73] Assignee  Imperial Chemical Industries Limited
              London, England
[32] Priority  June 30, 1967
[33]           Great Britain
[31]           30,353/67

[54] CONTINUOUS PROCESS FOR MAKING STABILIZED DISPERSION OF POLYMER IN ORGANIC LIQUID BY POLYMERIZING ETHYLENICALLY UNSATURATED MONOMER
6 Claims, 1 Drawing Fig.

[52] U.S. Cl. .................................................. 260/34.2,
                                                          260/33.6
[51] Int. Cl. ........................................ C08f 47/20,
                                                          C08j 1/48
[50] Field of Search ........................... 260/34.2,
                        33.6, 4, 836, 876, 881, 885, 901

[56] References Cited
UNITED STATES PATENTS
3,095,388  6/1963  Osmond et al. ............... 260/34.2
3,317,635  5/1967  Osmond ....................... 260/34.2

Primary Examiner—Allan Lieberman
Attorney—Cushman, Darby & Cushman

ABSTRACT: In a continuous process of making polymer in disperse form, ethylenically unsaturated monomer is fed diffusely, together with a dispersion stabilizer and an organic liquid, into the upper portion of a reaction mixture comprising a dispersion of polymer in the organic liquid contained in a reaction vessel of greater height than average width. A corresponding amount of polymer dispersion is drawn off from the bottom of the vessel. The reaction mixture may be stirred to prevent sedimentation of the disperse polymer but the upper and lower portions of the reaction mixture should not be mixed.

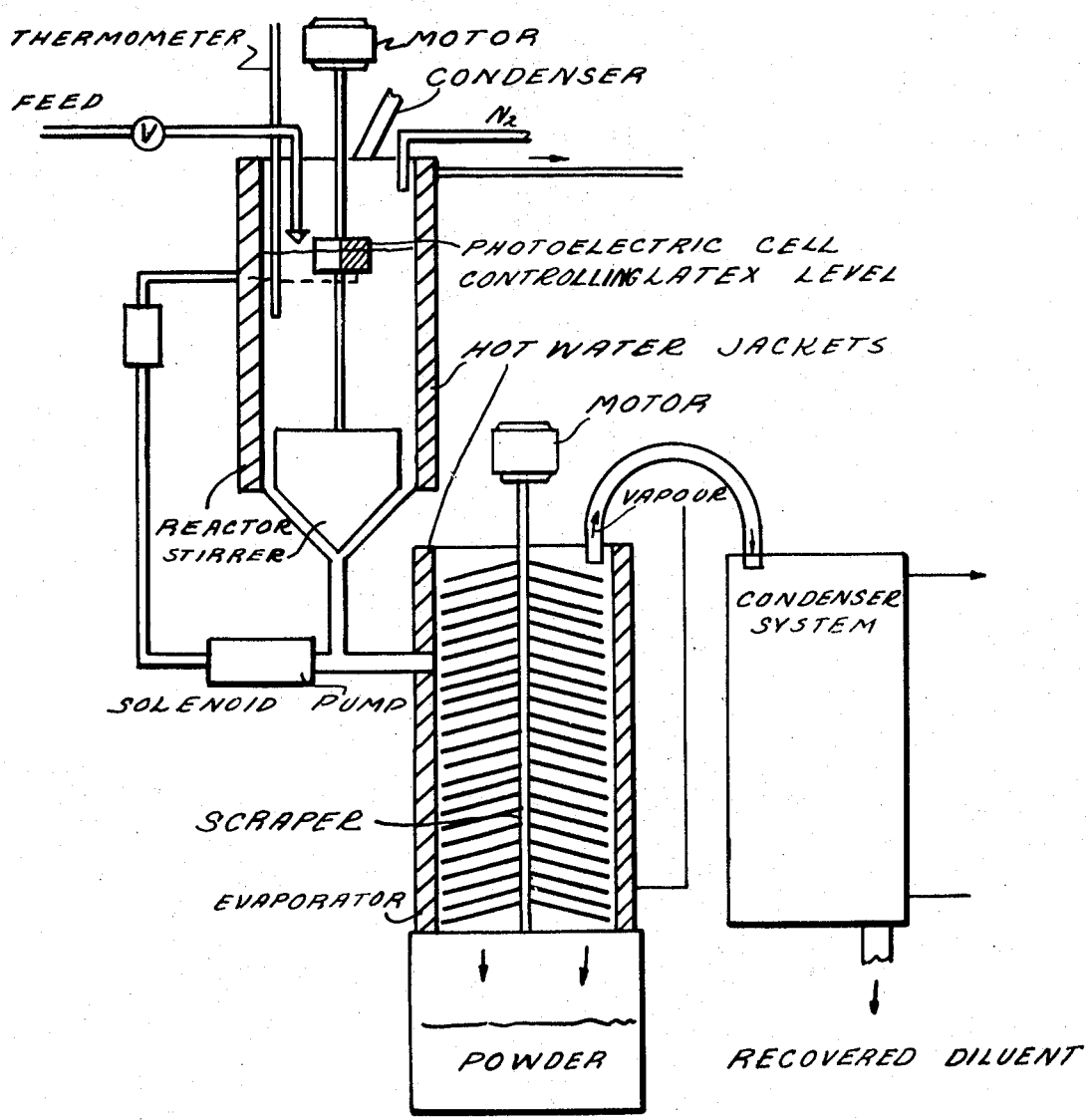

CONTINUOUS PROCESS FOR MAKING STABILIZED DISPERSION OF POLYMER IN ORGANIC LIQUID BY POLYMERIZING ETHYLENICALLY UNSATURATED MONOMER

This invention relates to a continuous process of making dispersions of addition polymer in organic liquid.

The process, which is generally applicable to ethylenically unsaturated monomers and particularly applicable to vinyl esters and esters of acrylic and methacrylic acids, comprises feeding monomer, stabilizer and organic liquid into a reaction vessel of greater height than average width containing a dispersion of the desired polymer in the desired organic liquid, the monomer being fed diffusely into the uppermost portion of the dispersion and a corresponding amount of polymer dispersion being drawn off at the bottom of the vessel, the contents of the vessel, particularly in the lower portion near the exit optionally being drawn off at the bottom of the vessel, the stirred to a degree sufficient to prevent sedimentation and accumulation of a layer of solid polymer but not so as to mix the upper and lower portions of the contents of the vessel.

The general principles of making stabilized dispersions of polymer in organic liquids by polymerizing monomer in an organic liquid in which the resulting polymer is insoluble, using a selected stabilizer to stabilize the resulting particles of insoluble polymer in the organic liquid, are known and described, for example, in British Patents Nos. 941,305 and 1,052,241, U.S. Pats. 3,095,388 and 3,317,635, and French Pat. No. 1,478,438 (corresponding to U.S. application Ser. No. 525,315). Materials suitable for use as stabilizers in such dispersion polymerization processes are also described in French Pat. No. 1,456,668 (corresponding to U.S. application Ser. No. 476,148) and French Pat. No. 1,455,273 (corresponding to U.S. application Ser. No. 476,201). These disclosures in the patents referred to above are incorporated herein by reference thereto and are relied on to provide background information on selection of appropriate monomers, organic liquids, stabilizers, etc.

The dimensions of height and width referred to above relate, of course, to the working capacity occupied by the dispersion contained in the vessel.

By diffuse addition of monomer we mean a form of addition in which the monomer, which is soluble in the organic liquid, is rapidly diluted by the dispersion in the region of the point of addition, e.g., it is added in one or more thin streams or as a spray rather than under conditions which create a localized high concentration of monomer.

We have found that when monomer is added in this way then, since as polymerization takes place the density of the dispersion increases, there is a self-regulating tendency in that as polymerization proceeds the polymer particles tend to sink to the lower part of the vessel from which the dispersion is drawn off. In other words, there is a density gradient from the upper part of the dispersion to the lower part and a feature of this invention is that this gradient is not disturbed by stirring the dispersion in such a way as to cause mixing of the upper and lower portions of the contents of the vessel. The process is particularly suitable when the monomer is such that it is absorbed in the polymer particles present in the dispersion in the vessel, the major part of polymerization of the monomer then taking place in the particles to produce particles which are more dense than the initial monomer swollen particles.

Formation of new polymer particles results from polymerization of monomer in solution in the organic liquid, a critical stage being reached at which the polymer chains coil up and aggregate with other chains and form "seed" particles which acquire an outer layer of stabilizer and then cease to grow by aggregation. Where the monomer is soluble in the polymer, these seed particles become swollen by monomer and grow in size as monomer is absorbed and polymerized in the particle. The number and size of the new particles formed at this stage can be controlled by selection of the stabilizer and/or adjustment of its concentration in the organic liquid. In general, the greater the tendency of the stabilizer to associate with the insoluble polymer, the smaller will be the size of the new stabilized particles. For example, in stabilizers of the block or graft copolymer type having one polymeric component which is relatively nonsolvated by the organic liquid and functions as an anchor for the stabilizer and another polymeric component which is solvated by the organic liquid and provides a stabilizing steric sheath around the particles, the lower the degree of solvation of the anchor component or the greater the weight ratio of anchor component to solvated stabilizing component the smaller will be the size of the new stabilized particles of insoluble polymer and vice versa. In stabilizers which are anchored to the particles by specific interaction between polar groups, the higher the energy of interaction, the smaller will be the new stabilized particle size, and vice versa. Further, the higher the concentration of stabilizer in the organic liquid the smaller will be the size of the new particles. Consequently these factors can be used to control the ultimate particle size of the dispersion as drawn off at the bottom of the vessel.

This facility of control over the stability of the polymer particles and over the rate of formation of new particles also makes it possible to produce by the process of this invention, dispersions containing more than 40 percent by volume of polymer without buildup of polymer on the walls of the reactor. Polymer dispersions containing 45 percent to 70 percent by volume of polymer have been produced without such buildup.

The formation of new particles of polymer will also be dependent on the concentration of free monomer in the liquid and this in turn will depend on the rate of addition and the proportion of monomer to organic liquid added to the dispersion. Particle size of the polymer dispersion and, in particular, distribution of particle size, can also be altered by altering the time of stay in the reaction vessel.

Alternatively, seed particles can be added to the vessel concurrently with the monomer feed. This is particularly useful when it is desired to form polymer in or on particles of a different polymer.

The particle size of the dispersion may range from $0.01\mu$ to $100\mu$, preferably $0.1\mu$ to $10\mu$, but another feature of this invention is that it is possible to make dispersions of average particle size greater than $0.5\mu$ and still maintain a high rate of reaction.

Preferably, the ratio of monomer feed to the volume of dispersion in the vessel is such that the time of stay in the vessel is from 5–120 minutes, more preferably 10–30 minutes.

Mixing of the upper and lower portions of the contents of the vessel is easier to avoid in vessels which are of greater height than width and preferably the working capacity of vessel is of height at least twice its average width. In order to reduce turbulence which might give rise to mixing of the upper and lower layers when the contents are stirred to prevent sedimentation, the vessel is preferably of circular cross section and can be generally cylindrical or conical in shape.

The process is applicable to ethylenically unsaturated monomers as described in the reference patents and is particularly suited to the lower esters, such as methyl, ethyl, butyl and $\beta$-ethoxy ethyl esters, and nitriles of acrylic and methacrylic acids and to vinyl esters such as vinyl acetate.

The process can be used to make dispersions of polymers (this term includes copolymers) of methacrylate esters of molecular weight in the range 50,000–100,000. Such polymers are particularly suitable for use in coating compositions. Methacrylate ester polymers of this molecular weight range may be made by the process of this invention using initiator and chain transfer agent in a proportion in the range 0.25–1 percent by weight of the monomer and a time of stay in the polymerization vessel of 15–45 minutes at a temperature of 80°–100° C.

The polymerization reaction is usually exothermic and the temperature of the dispersion in the vessel is controlled by circulation of a heat-transfer liquid in suitable coils or jackets. In one embodiment of the invention, in which the organic liquid of the dispersion is volatile, heat so abstracted from the reaction vessel is used to evaporate to dryness the polymer dispersion produced in the process. This can conveniently be done by passing the dispersion product and the heated heat-transfer liquid from the reaction vessel to an evaporator. The volatile liquid evaporated from the dispersion by heat from the heat-transfer liquid is condensed and reused in the polymerization process. The cooled heat-transfer liquid leaving the evaporator is recirculated to the reaction vessel, preferably through a heat exchanger by means of which overall control of the reaction and evaporation conditions can be maintained.

Alternatively the dispersion may be dried on a moving belt or by spray drying or the polymer may be separated by centrifugation.

The invention is illustrated by the following descriptions and with reference to the figure of the drawing which schematically represents the apparatus which may be used, by way of example, of continuous dispersion polymerizations carried out in an apparatus consisting of a long cylindrical reaction vessel of length approximately three times its diameter and arranged with its axis vertical. The lower end terminates in a cone leading to a runoff and the upper end is provided with a lid fitted with reflux condenser, thermometer and inlets for feed and nitrogen. The vessel can be gently stirred mechanically with a stirrer located at the bottom of the vessel so that while sedimentation is hindered, mixing of the contents of the vessel is kept to a minimum. The runoff fitted at the base of the vessel leads to a metering-out device. This device is controlled by a constant level sensing float inside the vessel. Other level-sensing means, such as photoelectric cells, can be used. Feed is metered into the vessel through capillary feed tubes. The reaction vessel is heated or cooled by circulating a heat-transfer fluid from a thermostat through a jacket surrounding the vessel. Boiling of the dispersion in the vessel is to be avoided since clearly this would result in undesired mixing of the upper and lower layers. However, since the dispersions are commonly made in volatile liquid the reflux condenser serves to return any liquid evaporated from the surface of the dispersion in the vessel.

Dispersion metered out from the base of the reaction vessel can be passed to a drier comprising a vertical cylindrical drying vessel in which the dispersion is thrown against the wall of the vessel which is jacketed and heated by heat-transfer liquid from the reaction vessel. The dispersion from which the organic liquid has been evaporated is scraped from the wall and falls into a receiver at the base of the drier. Organic liquid evaporated from the dispersion is drawn upwards through the drier by a gentle flow of air or preferably inert gas and into a condenser from which it is recovered.

At the beginning of a run, feed (monomer, stabilizer, initiator, chain transfer agent (if used) and organic liquid) is pumped at a predetermined rate into the heated reaction vessel through the capillary tubes and reacts while the vessel is being filled. The function of the capillary tubes is twofold, (a) to minimize the likelihood of blockages due to polymerization in the delivery tube, (b) to facilitate good mixing in the upper layer of the reactor. When the quantity of charge in the vessel reaches "working level" (the bulk of the charge should have reacted at this time) the automatic metering-out device begins to function and the working level is maintained. Alternatively, the vessel may, of course, be filled to the working level with a dispersion of preformed seed particles. When the dispersion drawn off through the metering-out device is fed to the drier, polymer powder is produced continuously. Heat of reaction is conducted away and is utilized in the drier, the thermostat serving to maintain the temperature of the system.

POLYMETHYL METHACRYLATE DISPERSION

Several dispersions were made in the apparatus described above using feeds of varying formulations as follows:

| | | |
|---|---|---|
| monomer | 50–80% | by weight of feed |
| azodiisobutyronitrile | 0.1–1.0% | by weight of monomer |
| primary octyl mercaptan | 0–1.5% | by weight of monomer |
| stabilizer | 4–6% | by weight of monomer |
| organic liquid | balance | |

The stabilizer, comprised in some runs, a molecular backbone of a copolymer of methyl methacrylate and methacrylic acid (95:5 percent by weight) on to which had been esterified side chains of a self-ester of 12–OH stearic acid of molecular weight about 1,800. In other runs a stabilizer precursor was used, the precursor comprising a copolymer of lauryl methacrylate and glycidyl methacrylate (97:3 by weight) which had been esterified with methacrylic acid. Part of the methyl methacrylate monomer copolymerized with the ethylenically unsaturated group provided in the precursor by the methacrylic acid to form a stabilizer.

The organic liquid in some runs was an aliphatic hydrocarbon of boiling range 70°–90° C. which enabled polymerization to be carried out just under reflux temperature in this range, and in other runs was n-heptane (boiling point 98.5° C.) with which the temperature of polymerization was about 95°–97° C. using an inert gas blanket.

The time of stay was varied from 20–80 minutes. Average monomer conversion was about 95 percent at the shorter times and 98 percent at the longer times.

The molecular weight of the polymer produced varied from $M\bar{w}$ 100,000 to 300,000, the higher values being obtained when no mercaptan was used.

The resulting dispersion contained from approximately 45–70 percent by volume of polymer (depending on the proportion of monomer in the feed) and particle size varied from an average of 3.5$\mu$ to 7$\mu$.

The monomer feed can contain minor proportions of other monomers such as ethyl acrylate, butyl methacrylate, $\beta$-ethoxy ethyl methacrylate, hydroxy ethyl methacrylate, glycidyl methacrylate, acrylonitrile, methacrylonitrile, dimethylaminoethyl methacrylate, butoxymethyl acrylamide, acrylic acid, methacrylic acid, itaconic acid, citraconic, maleic acid and anhydride, vinyl sulfonic acid and vinylidene chloride.

The use of lower boiling liquids as the continuous phase of the dispersion has advantages when the liquid is subsequently to be evaporated to produce dry polymer powder, particularly when the polymer has a low Tg and evaporation of the liquid has to be carried out at a correspondingly lower temperature. Useful lower boiling liquids include n-pentane (boiling point 36° C.) and n-hexane (boiling point 63° C.) and polymerization can be carried out at suitably lower temperatures, again conveniently just under the reflux temperature of the reaction mixture, using known initiators effective at these lower temperatures, e.g., a peroxy dicarbonate.

POLYVINYL ACETATE DISPERSIONS

Several dispersions were made in the apparatus described above using the following feed:

| | |
|---|---|
| monomer | 60% by weight of feed |
| azodiisobutyronitrile | 0.4% by weight of monomer |
| stabilizer precursor (as above) | 2% by weight of monomer |
| aliphatic hydrocarbon (70°–90° C.) | balance |

The time of stay was varied from 30–50 minutes at a temperature just under reflux temperature. The resulting polymer dispersion contained approximately 50 percent polymer by volume of molecular weight $M\bar{w}$ 650,000 to 1,300,000. The particle size on average was about 2.5$\mu$, longer runs producing particles of size 10$\mu$.

Higher conversions of monomer can be obtained at lower temperatures and it is then possible to use liquids of lower boiling point, such as n-pentane or n-hexane, in place of the 70°–90 C. hydrocarbon and an initiator effective below the reflux temperatures of such liquids, e.g., isopropoxy peroxy dicarbonate.

Vinyl acetate may be copolymerized with vinyl propionate in the same way.

POLYVINYL CHLORIDE DISPERSIONS

Vinyl chloride was polymerized in similar apparatus to that used for the polymerization of methyl methacrylate except that the reflux condenser was removed and the vessel was operated under pressure. N-pentane was used as the liquid continuous phase and isopropoxy peroxy dicarbonate as initiator. The polymerization temperature was 50° C. The stabilizer for the polymer particles was derived from a copolymer of lauryl methacrylate and methacrylic acid (98:2) which had been reacted with glycidyl methacrylate to introduce ethylenically unsaturated groups into the copolymer. The unsaturated copolymer was dissolved in the n-pentane and part of the vinyl chloride copolymerized with it to provide a graft copolymer stabilizer.

POLYACRYLONITRILE DISPERSIONS

A copolymer of acrylonitrile and vinyl acetate (5:1) was made in the same apparatus using n-heptane as the liquid continuous phase, azodiisobutyronitrile as the initiator and primary octyl mercaptan as a chain transfer agent. The stabilizer for the dispersion was derived from a precursor as used in the methyl methacrylate polymerizations. Reaction temperature was just under reflux in the range 90°–95° C.

The dispersion was run off at a solids content of 30 percent and the n-heptane and unreacted monomers were removed in the evaporator and recovered for reuse.

MALEIC ANHYDRIDE COPOLYMER DISPERSIONS

Dispersions of copolymers of maleic anhydride with styrene or olefines can be made in the same way as the polyacrylonitrile dispersions using benzoyl peroxide as initiator.

MIXED POLYMER DISPERSIONS

Into the apparatus described was fed a mixture of:

| | Parts |
|---|---|
| polyethyl acrylate dispersion | 600 |
| n-heptane | 155 |
| stabilizer (33% solution in n-heptane) | 85 |
| primary octyl mercaptan | 2 |
| azodiisobutyronitrile | 2 |
| methyl methacrylate | 500 |

The dispersion used in the feed consisted of particles of cross-linked polyethyl acrylate of size 0.05–0.2$\mu$ dispersed in n-heptane in a proportion of 40:60.

The stabilizer was as used in the above-described polymerizations of methyl methacrylate. Polymerization temperature (just below reflux) was 90°–95° C. Time of stay in the vessel was 40 minutes.

The dispersion produced consisted of particles of polymethyl methacrylate 0.1–5.0$\mu$ in diameter containing cores of the cross-linked polyethyl acrylate particles. The dry powder obtained on removal of the continuous phase of the dispersion was suitable for moulding articles and could be dissolved in solvents for polymethyl methacrylate to produce acrylic lacquer.

We claim:

1. A continuous process of making stabilized dispersions of polymer in organic liquid which comprises feeding ethylenically unsaturated monomer, stabilizer and organic liquid into a reaction vessel of circular cross section and of greater height than average width containing a dispersion of the desired polymer in the desired organic liquid, the monomer being fed diffusely into the uppermost portion of the dispersion so that it is rapidly diluted by the dispersion and a corresponding amount of polymer dispersion being drawn off at the bottom of the vessel, the contents of the vessel being stirred to a sufficient degree to prevent sedimentation and accumulation of a layer of solid polymer in the lower portion of the reaction but not so as to mix the upper and lower portions of the constants of the vessel and the time of stay in the reaction vessel being from 5–120 minutes.

2. A process as claimed in claim 1 in which the vessel is of height at least twice its average diameter and is of circular cross section.

3. A process as claimed in claim 1 in which the monomer is added in one or more thin streams.

4. A process as claimed in claim 1 in which the organic liquid is volatile and heat evolved in the polymerization reaction is used in evaporation of the organic liquid from the dispersion of polymer.

5. A process as claimed in claim 4 in which a heat-transfer liquid is used to control the temperature of an exothermic reaction, the dispersion produced in the reaction being passed to an evaporator to which heat is supplied by the heat-transfer liquid.

6. A process as claimed in claim 1 in which the organic liquid is volatile and is evaporated after the dispersion has been drawn off from the vessel.

* * * * *